(12) United States Patent
Ericson

(10) Patent No.: US 7,618,023 B2
(45) Date of Patent: Nov. 17, 2009

(54) METHOD AND A DEVICE FOR REMOVING VEHICLE WINDOWS

(75) Inventor: Rolf Ericson, Falun (SE)

(73) Assignee: Ramhuset-Dalaspeglar AB, Falun (SE)

( * ) Notice: Subject to any disclaimer, the term of this patent is extended or adjusted under 35 U.S.C. 154(b) by 510 days.

(21) Appl. No.: 10/556,500

(22) PCT Filed: May 21, 2003

(86) PCT No.: PCT/SE03/00818

§ 371 (c)(1),
(2), (4) Date: Jun. 16, 2006

(87) PCT Pub. No.: WO2004/103747

PCT Pub. Date: Dec. 2, 2004

(65) Prior Publication Data

US 2007/0040415 A1 Feb. 22, 2007

(51) Int. Cl.
*B66D 1/26* (2006.01)
(52) U.S. Cl. .............. 254/278; 254/293; 83/13; 296/201; 294/65; 294/15; 29/426.4; 29/559; 269/71; 269/909
(58) Field of Classification Search ............ 254/278, 254/279, 293; 83/13, 200.1, 651; 296/201; 425/11, 12, 13; 156/94; 264/36.1; 294/65, 294/15; 29/426.4, 26.6, 559, 239, 244; 269/71, 269/61, 909
See application file for complete search history.

(56) References Cited

U.S. PATENT DOCUMENTS

| | | | | |
|---|---|---|---|---|
| 3,765,550 A | * | 10/1973 | Tausheck | 414/541 |
| 3,770,259 A | * | 11/1973 | Wagreich | 269/21 |
| 4,457,503 A | * | 7/1984 | Connor | 269/21 |
| 6,101,702 A | * | 8/2000 | Claycomb et al. | 29/426.4 |
| 6,338,619 B1 | * | 1/2002 | Rusch | 425/11 |
| 6,543,117 B1 | * | 4/2003 | Claycomb et al. | 29/426.4 |
| 7,270,357 B1 | * | 9/2007 | Liao | 294/65 |
| 2002/0121330 A1 | | 9/2002 | Erikkson | |
| 2003/0206103 A1 | * | 11/2003 | Morrone et al. | 340/545.1 |
| 2003/0209642 A1 | * | 11/2003 | Fontana et al. | 248/231.91 |
| 2005/0167556 A1 | * | 8/2005 | Fontana et al. | 248/231.91 |
| 2007/0000361 A1 | * | 1/2007 | Ericson | 83/13 |
| 2007/0040415 A1 | * | 2/2007 | Ericson | 296/201 |

FOREIGN PATENT DOCUMENTS

| | | |
|---|---|---|
| DE | EP0437793 | 7/1991 |
| DE | 4012207 | 10/1991 |
| EP | 0093283 | 11/1983 |
| FR | 2765130 | 12/1998 |
| JP | 8-1598 | 1/1996 |
| JP | 2001-105473 | 4/2001 |
| WO | WO 8607017 | 12/1986 |

* cited by examiner

Primary Examiner—Emmanuel M Marcelo
(74) Attorney, Agent, or Firm—Young & Thompson

(57) ABSTRACT

A method for the non-destructive removal of fixed window elements (1) from vehicles uses a cutting wire (15) that is threaded through the adhesive bonding a window element to a vehicle and that is placed in a loop around the perimeter of the window element. A first end (15A) of the cutting wire is attached to a first wire wind-up element (16) of a single tool (3) and a second end (15D) of the cutting wire is attached to a second wire wind-up element (17) of the single tool. The first and second ends of the wire are then pulled with the first and second wire wind-up element until the wire cuts through the adhesive around the entire perimeter of the side window element.

15 Claims, 5 Drawing Sheets

A-A

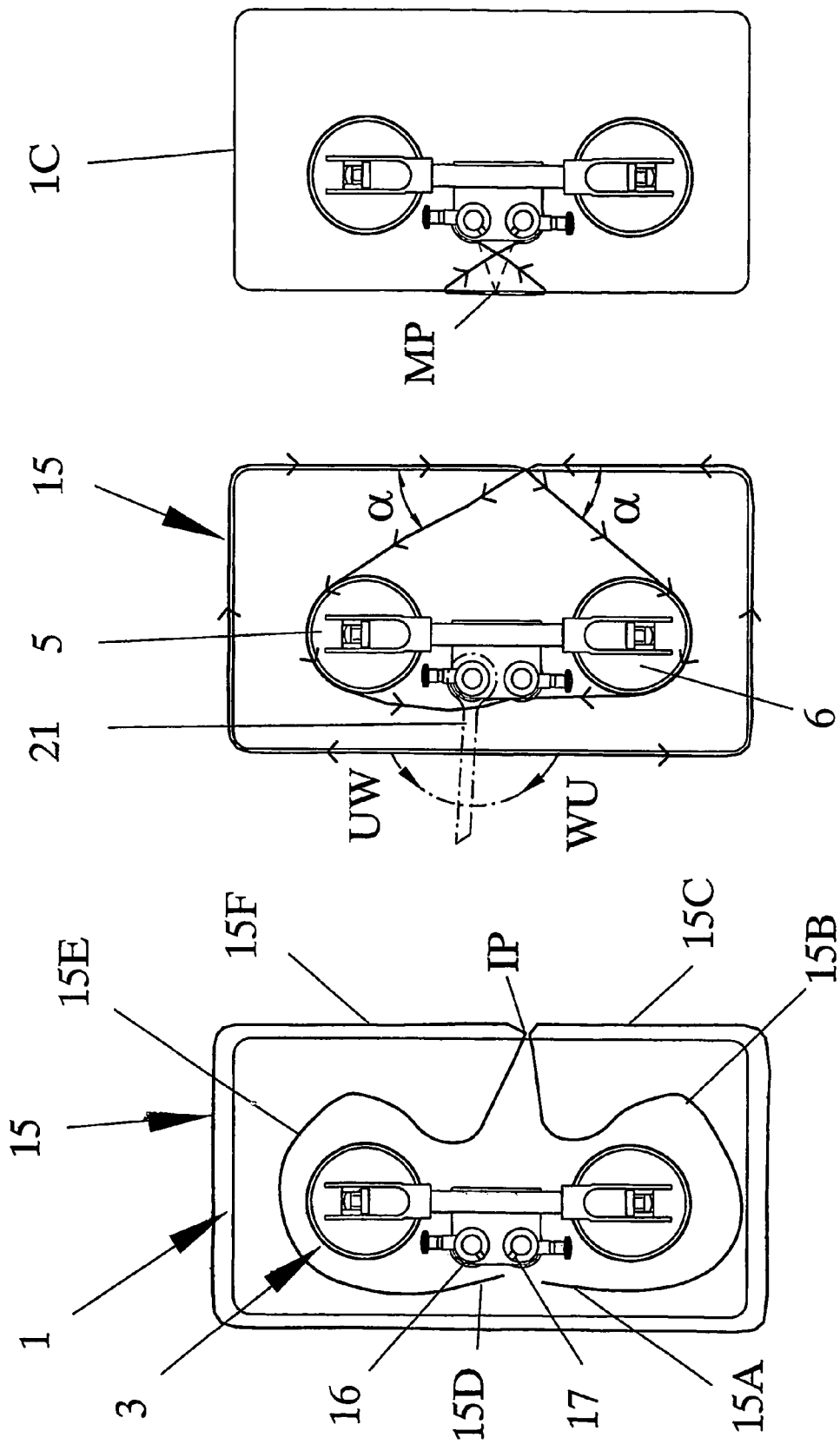

METHOD AND A DEVICE FOR REMOVING
VEHICLE WINDOWS

TECHNICAL FIELD

The present invention relates in general to fixed window elements of vehicles. In particular, the invention relates to a method and a device for removing a fixed side window from a vehicle.

BACKGROUND OF THE INVENTION

The removal of fixed vehicle glazing in one piece for replacement or salvage purposes involves penetrating and cutting through the adhesive seal bonding a window element to an associated frame of a vehicle. Throughout the years, various methods for the removal of mainly vehicle windshields and rear windows have been suggested and practiced. Among such known methods are those where a knife or similar tool is used to cut through the adhesive bond and an outward pressure is simultaneously applied to the windshield, see e.g. U.S. Pat. No. 6,101,702. Other methods make use of a wire that is threaded through the adhesive bond and that is moved back and forth to cut through the seal all around the perimeter of the windshield, see e.g. U.S. Pat. Nos. 4,995,153 and 5,622,093. All of the described methods are comparatively time-consuming and cumbersome and involve an apparent risk of damaging both the actual window element and interior or exterior parts of the vehicle.

An improved method for the removal of vehicle windshields is described in my pending U.S. Patent Application No. 326 763. This method is based on the combined use of two separate tools that at spaced locations are secured to the windshield by means of suction cups and that each comprise means for winding up one end of the wire threaded through the adhesive bond of the windshield. Due to the considerable space required for the two separate hand tools and their repositioning during the cutting operation, this method is specifically designed for the removal of windshields.

Recently, there has been an increased interest in the non-destructive removal of fixed side window elements from vehicles. One of the main reasons for this is that insurance companies are becoming more and more reluctant to pay for the replacement of fixed side windows that are undamaged after an accident but that will have to be removed in order to perform high quality body repair and paint work. In such situations, it has up to the present day been common practice to crush the window element, with the resulting cleaning and additional cost of a new window element. The only remaining options are to use one of the above described time-consuming, cumbersome and possibly damaging methods employing a knife or a manually operated wire. Additionally, such methods often cause damages also to the actual window element, so that the window element will have to be replaced anyway.

SUMMARY OF THE INVENTION

The invention provides a solution overcoming the above discussed problems experienced with the prior known techniques for removing fixed window elements from vehicles.

It is a basic object of the invention to provide an improved method for the non-destructive removal of a fixed window element from a vehicle, which method may be performed on small side window elements.

It is a further object of the invention to provide an improved device for performing the non-destructive window element removal method of the invention.

It is a further object of the invention to provide a method for the non-destructive removal of a window element from a vehicle by which a fixed side window element may be easily removed with a minimum of operations.

Briefly, the invention provides a method for removing fixed vehicle windows using a cutting wire that is threaded through the window element adhesive and that is placed in a loop around the perimeter of the window element. According to the invention a first end of the cutting wire is attached to a first wire wind-up means of a single tool and a second end of said cutting wire is attached to a second wire wind-up means of said single tool. The first and second ends of the wire are then pulled with the first and second wire wind-up means until the wire cuts through the adhesive around the entire perimeter of the side window element. The suggested method is very compact both with regard to the actual space occupied by the single two-winch tool and with regard to the operation thereof. Therefore, said method provides a unique possibility for secure and effective non-destructive removal of smaller-sized fixed side windows from vehicles.

According to another aspect of the present invention, the invention provides a suction cup tool for use in performing the method of the invention. Briefly, said tool has two separate spaced winches provided thereon for receiving and maneuvering the respective free ends of the looped cutting wire having been threaded through the adhesive bond of a window element.

These and further objects of the invention are met by the invention as defined in the appended patent claims.

Advantages offered by the present invention, in addition to those described above, will be readily appreciated upon reading the below detailed description of embodiments of the invention.

BRIEF DESCRIPTION OF THE DRAWINGS

The present invention and further objects, features and advantages thereof will be more fully understood by reference to the following detailed description of embodiments of the invention when read in conjunction with the accompanying drawings, where:

FIGS. 2A-C illustrate the sequence of operations for removing a side window using the single tool of the device of the present invention, as illustrated in FIGS. 1A-1B;

DETAILED DESCRIPTION OF EMBODIMENTS

Figure 1A:
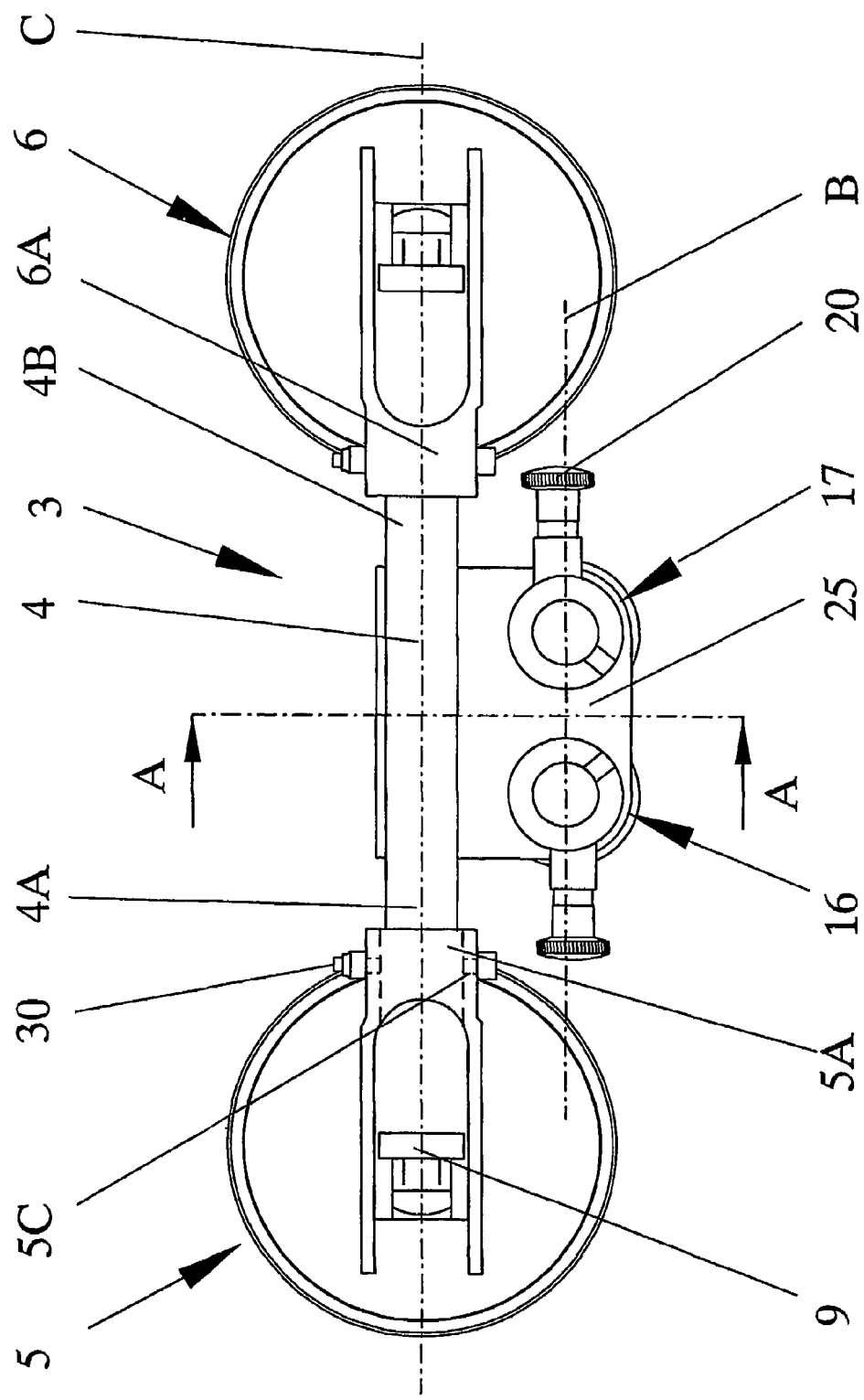
FIG. 1A is a top elevational view of a first embodiment of a device of the invention.
Figure 1B:
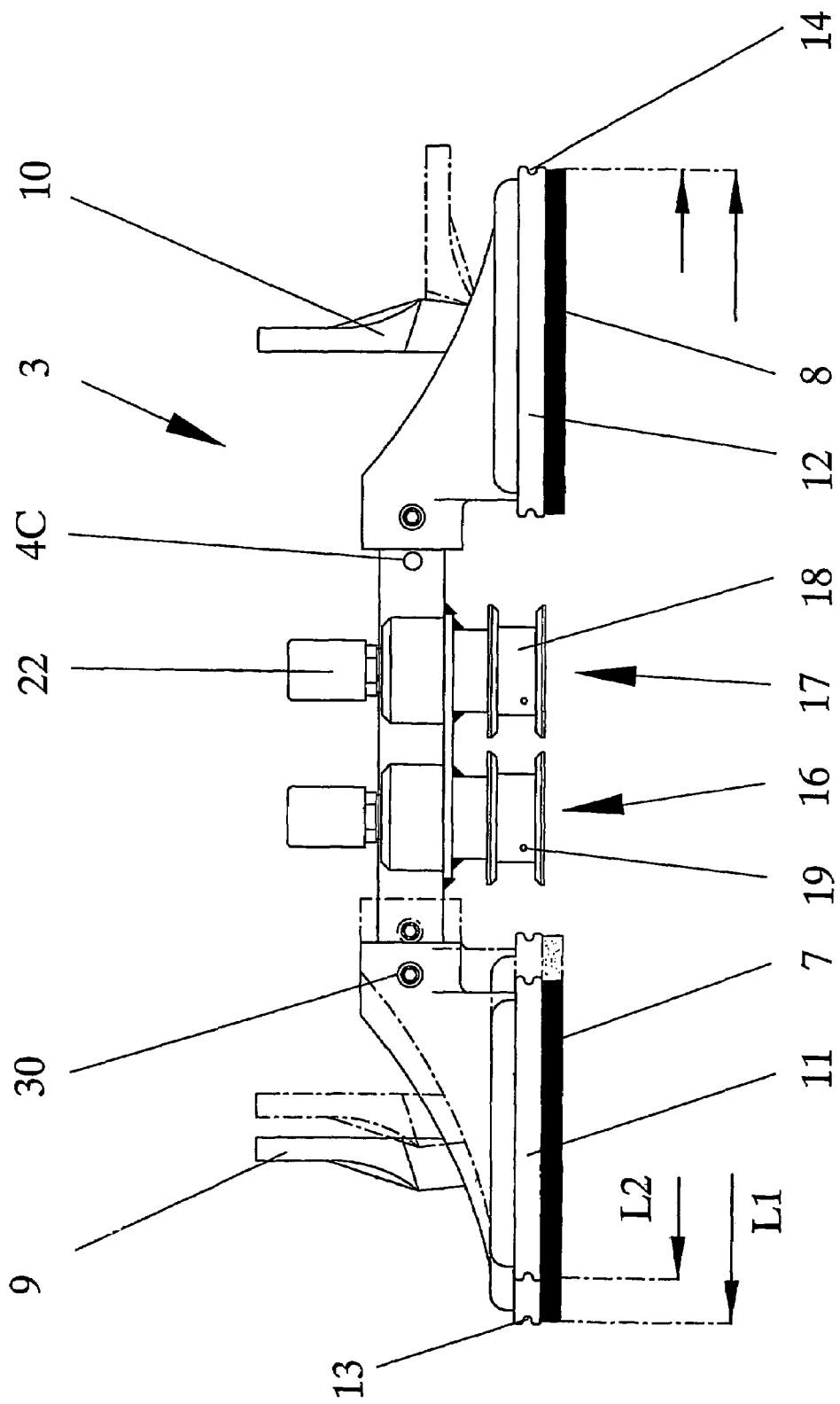
FIG. 1B is a side elevational view of the device illustrated in FIG. 1A.
Figure 1C:
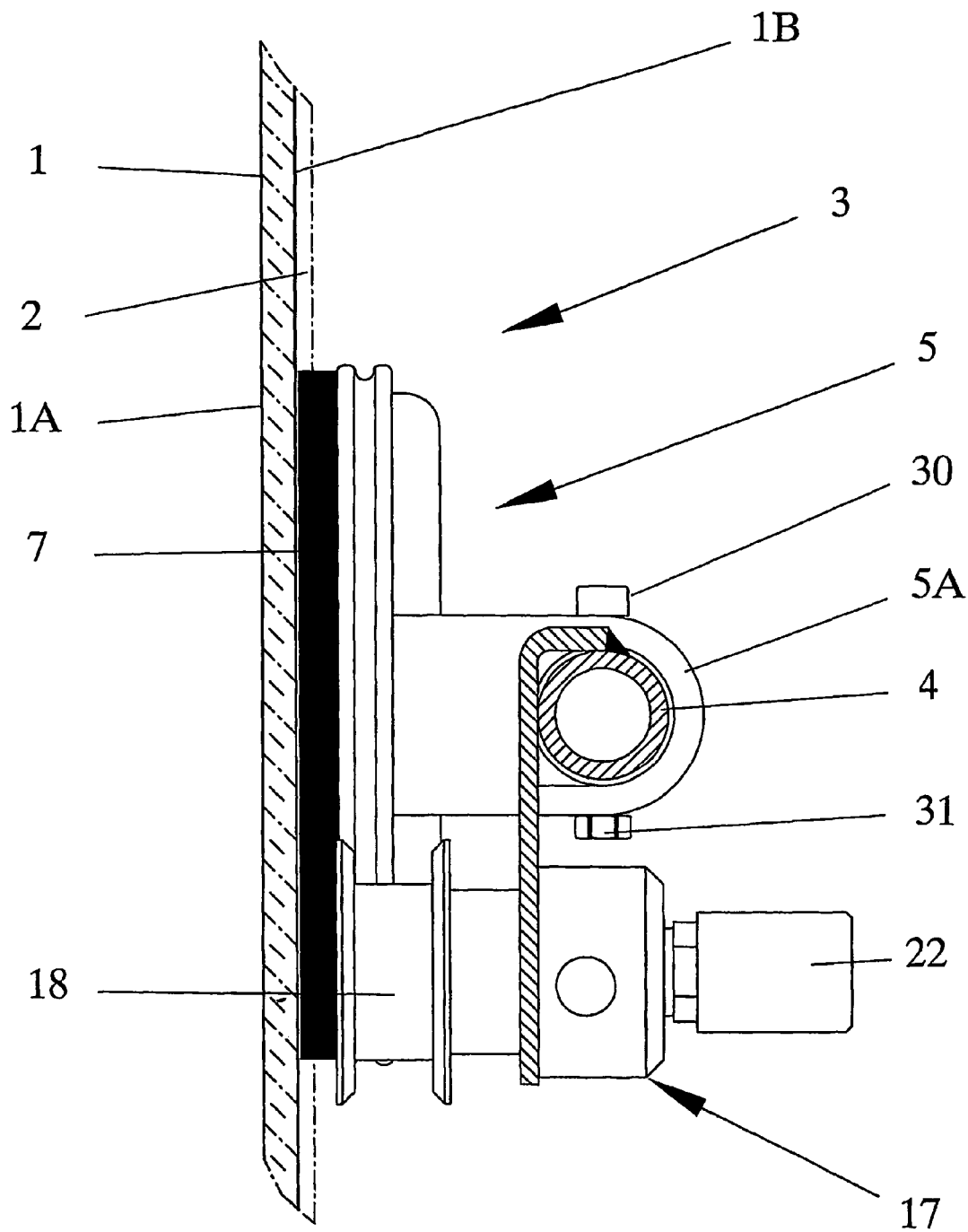
FIG. 1C is a partially schematic cross section along line A-A through the device illustrated in FIG. 1A.

An exemplary illustrative embodiment of the tool 3 according to the invention is illustrated in FIGS. 1A, 1B and 1C. The basic design of this tool 3 is based on that of a hand tool that is presently used in the inventors own system "Roll out 2000®" that is employed for cutting the sealant/adhesive bonding a vehicle windshield to the vehicle body and thus for removing such a windshield. In said basic design the tool 3 has an elongate handle 4 with two suction members 5, 6 that are attached to each end section 4A, 4B of the handle 4, preferably by means of bolts 30 and nuts 31. The bolts are extended through holes, only one hole 5C indicated to the left in FIG. 1A, in support portions 5A, 6A of the respective suction members 5, 6 and through bores 4C in the respective end regions 4A, 4B of the handle.

In the illustrated embodiment of the invention the mutual distance between the suction members 5, 6 and thereby the overall length L1, L2 of the tool 3 is adjustable, see specifically FIG. 1B. In the illustrated embodiment the adjustability is achieved by providing a number of spaced through-bores 4C in the respective end regions 4A, 4B of the handle 4. In this embodiment two through bores 4C are provided at each end section and of these only one is visible in FIG. 1B. The suction members 5, 6 are attached to the respective end region 4A, 4B of the handle 4 by inserting the bolts 30 through the appropriate bores 4C in the handle end regions 4A, 4B. Thus, by choosing different bores 4C for the bolts 30, the length of the tool 3 may be varied in steps for adaption to the window element to be removed. The suction member 5, 6 support portions 5A, 6A receive the respective end sections 4A, 4B of the handle with a loose fit in order to permit that the tool is appropriately secured to curved window elements.

The suction members 5, 6 have round rubber suction cup segments 7, 8 and latch devices 9, 10, respectively. By engaging the latch devices 9, 10, i.e. pulling the devices from an upright position, illustrated with solid lines in FIG. 1B, towards the segments and into a horizontal position, indicated with dash-dot lines for the latch device to the right in FIG. 1B, suction is applied to the segments 7, 8 and the segments may be firmly adhered to a smooth surface. The segments 7, 8 are attached to metal discs 11, 12 that have guide grooves 13, 14, respectively, defined therein for guiding a cutting wire 15 that will be attached to the tool 3, as will be described below.

The tool 3 of the invention is provided with two winch mechanisms 16, 17. The winch mechanisms 16, 17 are supported on a bracket 25 that is attached to the tool 3 at a mid-portion of the handle 4. In the illustrated embodiment the pair of winch mechanisms 16, 17 are provided side by side, at a distance from each other, along a line B being approximately parallel to the centre axis C of the handle 4. Said two winch mechanisms 16, 17 on the inventive tool 3 may be of the same general kind as the single one of the presently used hand tool. More particularly, such a winch mechanism 16, 17 has a roller 18 for receiving and winding up the wire 15. The wire 15 may be inserted into an eccentrically positioned opening 19 for holding the wire 15 to the roller 18 during winding-up rotation of the roller 18. The winding-up roller 18 is rotatable in a winding-up direction WU and is provided with an internal locking mechanism (not specifically illustrated) that normally prevents rotation of the roller 18 in the opposite direction. Each winch mechanism 16, 17 has a release button 20 for releasing the locking mechanism so that the roller 18 may also be rotated in an opposite direction UW to unwind the wire 15.

Rotation of the respective winding-up roller 18 is performed by means of a wrench-like handle 21 (see FIG. 2B), such as a ratchet wrench or other similar means, engaging a socket 22 provided at an upper end of each roller 18. The two adjacent winch mechanisms 16, 17 of the inventive hand tool 3 are preferably each rotatable in the same directions WU and UW, respectively, for the winding-up and unwinding of the cutting wire 15. It is perceived by the user to be most practical to wind up the two wire ends by rotating the associated winches in the same direction and in particular in combination with the use of a ratchet wrench that would otherwise have to be re-adjusted whenever it is moved from one winch to the other.

The use of the above described device/tool 3 in performing the method of the invention will now be explained with specific reference to FIGS. 2A-C. Initially, a cutting wire 15 is inserted through the adhesive normally bonding a fixed vehicle side window element 1 to a schematically indicated receiving frame 2, see FIG. 1C, of a vehicle that is not specifically illustrated. A length of the cutting wire 15 is inserted through the adhesive bonding between a side edge 1C of the window element 1 and the frame 2 by means of a commonly used hollow needle, not illustrated. The length of the wire 15 is adapted to the size of the window element 1, as will be clarified below. In particular, at an insertion point IP, both ends 15A, 15D of the wire 15 are inserted from a first side 1A of the window 1, normally an outside thereof, to a second side 1B of the window 1, which is normally the inside thereof, so that said free ends 15A, 15D are disposed inside the vehicle. The wire end sections 15A, 15B and 15D, 15E on the inside are approximately of equal length. The portion 15C, 15F of the wire 15 that is on the first side/outside 1A of the window 1 is arranged in a closed loop around the perimeter of the window 1, as will be seen in FIG. 2A. The user may pull a bit on both ends on the inside so that the wire 15 is snugly applied around the edge 1C of the window element 1 on the outside thereof, as shown in FIG. 2B.

The device/tool 3 is attached to the second side 1B of the window 1 by applying the vacuum to the suction cups 7, 8. A first end 15A and a further adjacent inside section 15B of the wire 15 is guided around one of the suction members 6, in its associated groove 14. The wire end 15A is attached to the roller 18 of one of the winch mechanisms 16, as described above. In particular, the first wire end 15A is attached to the winch mechanism roller 18 that is most distant from the suction member 6 guiding this wire end section 15A, 15B, for reasons to be described further below. Operating the wrench 21 activates the winch mechanism 16, so that the wire is pulled and the tension thereof is increased and an acute angle α is formed between the inside section 15B of the wire 15 and an outside section 15C thereof. Such an acute angle improves the cutting effectiveness. As the tension in the wire 15A-15C is further increased, the wire will start cutting through the adhesive between the window element 1 and the frame 2 at the acute angle α.

This initial operation, tensioning the first end wire sections 15A-C serves an important purpose in addition to the cutting action, since it is used to establish that the wire ends are not crossed at the insertion point IP. In case the wire ends were crossed at the insertion point IP the tensioning of the first wire end section would inevitably have the effect that the crossed, loose wire end would be brought along in the cutting movement of the tensioned wire section. As soon as it has been established that the wire sections are not crossed, the second end 15D of the wire 15 may be attached to its associated winch mechanism 17. At this stage it is optional whether to complete the operation of the first winch mechanism 16 or to alternatingly operate the two winches 16, 17 until its associated wire sections 15A-C, 15D-F reach a meeting point MP (see FIG. 2C), where the two wire section will meet to complete the cutting-loose of the window 1 from the frame 2.

In the first case, the wire 15A-C is wound up on the roller 18 of the first winch mechanism 16 and the cutting point, at the angle α between the wire sections 15B and 15C, moves from the insertion point IP and all the way up to the meeting point MP, until operation of the second winch mechanism 17 is initiated. In said first case it is not necessary to attach the second, loose wire end 15D during the operation of the first winch 16, since the wire 15 is prevented from sliding along the outer edges of the window 1 by the friction between the adhesive and the wire 15. However, in the latter case, the second end 15D of the wire is attached to the winch mechanism 17 as soon as it has been established that the wire sections do not cross, and the two winch mechanisms are operated alternatingly, until both wire sections 15A-C and 15D-F meet at the meeting point MP.

By arranging the wire ends 15A, 15D so that they are attached to the respective winch mechanism roller 18 being most distant from the associated guiding suction member 5, 6 and so that the wire ends cross in the area of the winch mechanisms, the favorable acute cutting angle α is maintained during the full cutting operation for both wire sections 15A-C, 15D-F. This means that effective cutting is achieved all around the perimeter of the window 1 without requiring any adjustment of the position of the single tool 3.

In the illustrated embodiment the insertion point IP is at approximately a midpoint of one side of the window element 1, and this may be regarded as a normally chosen position. However, the invention is not restricted to choosing such a position for the insertion point IP. In fact, the most suitable insertion point IP will vary for each application and/or situation, and may even be at an upper or lower side of the window element 1, as seen in FIGS. 2A-C. The only effect that such varied locations for the insertion point IP will have upon the inventive method is that one of the winch mechanisms 16 or 17 will have to be operated more than the other one.

The method and device of the present invention are unique in that they permit secure non-destructive removal of fixed side windows from vehicles. Furthermore, the method of the invention is very effective and easy to perform, since the operator uses a single tool and since the full cutting-loose of a window element may be performed without requiring any re-positioning of the device.

Figure 4:
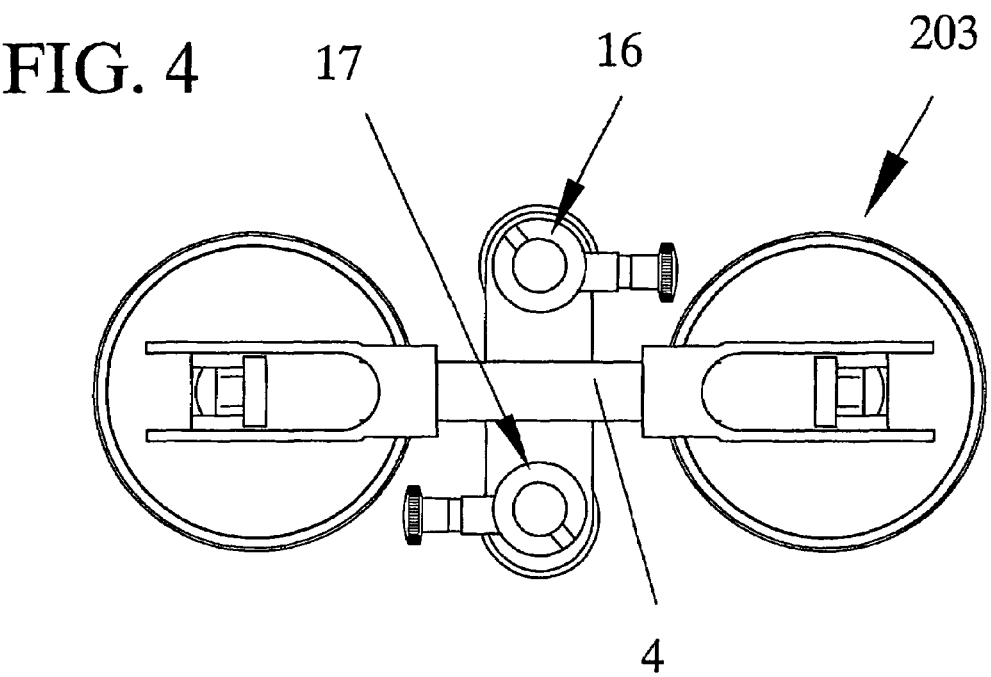
FIGS. 3 and 4 illustrate modified embodiments of a device according to the invention.
Figure 3:
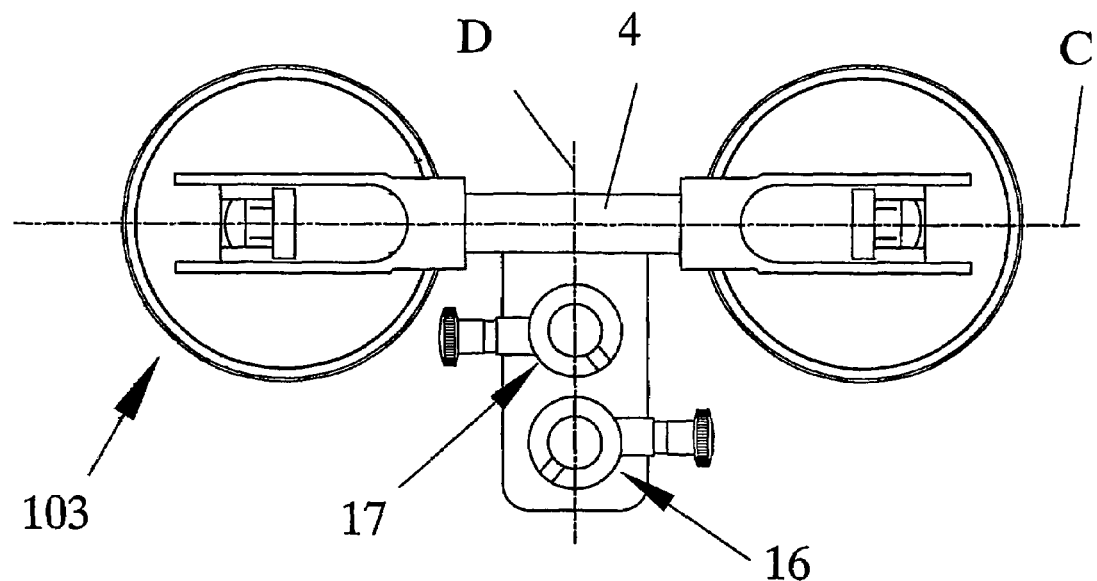

The invention has been described in connection with what is presently considered to be the most practical and preferred embodiment, but it is to be understood that the invention is not to be limited to the disclosed embodiment. For instance, the device 3 has been disclosed in an embodiment where the two winches 16, 17 are provided side by side along a line that is generally parallel to the handle. This is the arrangement that is regarded to be most practical for normal applications and that is presently preferred. However, this does not preclude that other winch arrangements may be suitable for specific situations or applications. Examples of such possible modified arrangements are illustrated in FIGS. 3 and 4. FIG. 3 illustrates an embodiment of the tool 103 where the two winches 16, 17 are positioned side by side along a line D crossing a centre line C of the handle 4 at a right angle. FIG. 4 illustrates an embodiment of the tool 203 where the two winches 16, 17 are positioned on different sides of the handle 4.

Modifications of said embodiments, such as a variant of the one in FIG. 3, having the two winches arranged side by side along a line not being perpendicular to the centre line of the handle, are likewise covered by the invention. The main advantage of the described modified embodiments is that the length of the handle and thereby of the entire tool may be reduced. On the other hand, such modified embodiments may require re-positioning of the device in order to complete the cutting action around the full perimeter of the window.

The invention is therefore intended to cover various modifications and equivalent arrangements included within the spirit and scope of the appended claims.

The invention claimed is:

1. A method of removing a fixed window element from a vehicle, said window element having a first side and a second side and having an edge area being bonded to a receiving frame of the vehicle with an adhesive, comprising the steps of:

inserting first and second ends of a wire from the first side of the window element through the adhesive to the second side of the window element to form a loop of the wire on said first side thereof, and applying the loop of the wire along the edge of the window element between the window element and the frame;

attaching the first end of the wire to a first wire wind-up mechanism of a single tool secured to said second side of the window element and pulling the first end of the wire with the first wire wind-up mechanism to tension the wire;

attaching the second end of the wire to a second wire wind-up mechanism of said single tool; and pulling the first and second ends of the wire until the wire cuts through the adhesive at the edge of the window element around the entire perimeter thereof.

2. A method according to claim 1, wherein the tool is maintained in its initial position on the second side of the window element during the entire process of cutting loose the window element from the frame.

3. A method according to claim 2, wherein the first and second ends of the wire are pulled one at a time by the associated wind-up mechanisms until associated wire sections reach a meeting point where the wire has cut through the adhesive at the edge of the window element around the entire perimeter thereof.

4. A method according to claim 2, wherein the wind-up mechanisms are operated in the same direction for winding up the associated wire sections thereon.

5. A method according to claim 1, wherein the first and second ends of the wire are pulled one at a time by the associated wind-up mechanisms until associated wire sections reach a meeting point where the wire has cut through the adhesive at the edge of the window element around the entire perimeter thereof.

6. A method according to claim 5, wherein the first end of the wire is pulled by its associated wind-up mechanism until a corresponding section of the wire has cut through the adhesive at the edge of the window element up to a meeting point, before the second end of the wire is pulled by its associated wind-up mechanism.

7. A method according to claim 5, wherein the first and second ends of the wire are alternatingly pulled by the associated wind-up mechanisms until associated wire sections reach a meeting point where the wire has cut through the adhesive at the edge of the window element around the entire perimeter thereof.

8. A method according to claim 1, wherein the wind-up mechanisms are operated in the same direction for winding up the associated wire sections thereon.

9. A method of removing a fixed side window element from a vehicle, said side window element having a first side and a second side and having an edge area being bonded to a receiving frame of the vehicle with an adhesive, comprising the steps of:

inserting first and second ends of a wire from the first side of the side window element through the adhesive to the second side of the side window element to form a loop of the wire on said first side thereof, and applying the loop of the wire along the edge of the side window element between the side window element and the frame;

attaching the first end of the wire to a first wire wind-up mechanism of a single tool secured to said second side of the window element and pulling the first end of the wire with the first wire wind-up mechanism to tension the wire;

attaching the second end of the wire to a second wire wind-up mechanism of said single tool; and pulling the first and second ends of the wire until the wire cuts through the adhesive at the edge of the side window element around the entire perimeter thereof.

10. A device for removing a fixed window element from a vehicle and having two spaced suction members supported by a handle, wherein two wire wind-up mechanisms are supported by the handle at a distance from each other.

11. A device according to claim 10, where each wind-up mechanism is rotatable in opposite directions for the winding-up and unwinding of a cutting wire, and wherein the two wire wind-up mechanisms are rotatable in the same directions for the winding-up and unwinding, respectively, of the cutting wire.

12. A device according to claim 11, wherein the two wind-up mechanisms are provided side by side along a line being approximately parallel to a centre line of the handle.

13. A device according to claim 11, wherein the two wind-up mechanisms are provided side by side along a line being approximately parallel to a centre line of the handle.

14. A device according to claim 10, wherein the mutual distance between the suction members and thereby the overall length of the tool is adjustable.

15. A device according to claim 10, wherein the two wind-up mechanisms are provided side by side along a line being approximately parallel to a centre line of the handle.

* * * * *

UNITED STATES PATENT AND TRADEMARK OFFICE
CERTIFICATE OF CORRECTION

| | |
|---|---|
| PATENT NO. | : 7,618,023 B2 |
| APPLICATION NO. | : 10/556500 |
| DATED | : November 17, 2009 |
| INVENTOR(S) | : Rolf Ericson |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 704 days.

Signed and Sealed this

Fourteenth Day of December, 2010

David J. Kappos
*Director of the United States Patent and Trademark Office*